United States Patent
Hertz et al.

(10) Patent No.: US 9,502,881 B2
(45) Date of Patent: Nov. 22, 2016

(54) SWITCHGEAR FOR CONTROLLING THE ENERGY SUPPLY OF AN ELECTRIC MOTOR CONNECTED THERETO

(75) Inventors: Dirk Hertz, Fichtenhof (DE); Marco Schönenberg, Kümmersbruck (DE); Johann Seitz, Amberg (DE); Stefan Zitzler, Schwandorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 33 days.

(21) Appl. No.: 14/423,449

(22) PCT Filed: Aug. 30, 2012

(86) PCT No.: PCT/EP2012/066881
§ 371 (c)(1),
(2), (4) Date: May 7, 2015

(87) PCT Pub. No.: WO2014/032718
PCT Pub. Date: Mar. 6, 2014

(65) Prior Publication Data
US 2015/0303676 A1    Oct. 22, 2015

(51) Int. Cl.
*G05B 11/01*    (2006.01)
*G01P 3/00*    (2006.01)
(Continued)

(52) U.S. Cl.
CPC ............... *H02H 3/08* (2013.01); *H01H 9/541* (2013.01); *H02P 3/22* (2013.01); *H02P 29/025* (2013.01)

(58) Field of Classification Search
CPC .......... H02J 9/062; H02J 3/1842; H02J 9/06; H02J 2009/068; H02J 3/1807; H02J 3/1814; H02J 3/386; H02J 9/00; H02J 9/04; H02J 9/061; H01H 9/542; H01H 9/541; H01H 2009/543; H01H 33/143; H01H 33/596
USPC ............ 318/432, 461, 800; 361/18, 20, 100; 307/64, 112
See application file for complete search history.

(56) References Cited

U.S. PATENT DOCUMENTS 4,100,469 A * 7/1978 Nelson .................... H02P 1/28
318/721
(Continued)

FOREIGN PATENT DOCUMENTS

DE    1227109 B    10/1966
DE    1415980 A1    1/1969
(Continued)

OTHER PUBLICATIONS

International Search Report PCT/ISA/210 for International Application No. PCT/EP2012/066881 dated Jan. 25, 2013.
(Continued)

*Primary Examiner* — Paul Ip
(74) *Attorney, Agent, or Firm* — Harness, Dickey & Pierce, P.L.C.

(57) ABSTRACT

An embodiment of the invention relates to a switchgear which includes a control unit, a supply connection and a first current path. The first current path includes a first electromechanical switch and, connected in series to the first switch, a parallel connection of a second electromechanical switch to a semiconductor switch. The switchgear includes an energy accumulator and a measuring device. A control unit is capable of monitoring energy supply coming in through the supply connection. If the energy supply through the supply connection reaches a critical range, the control unit controls the output of the switching signals via the energy of the energy accumulator such that: in a first step, the semiconductor switch is switched to be electrically conducting and the second switch is then opened, and in a second step, the semiconductor switch is switched to be electrically non-conducting and the second switch is then opened.

12 Claims, 1 Drawing Sheet

(51) Int. Cl.
  *H02H 3/08* (2006.01)
  *H02P 29/02* (2016.01)
  *H02P 3/22* (2006.01)
  *H01H 9/54* (2006.01)

(56) References Cited

U.S. PATENT DOCUMENTS

| | | | | |
|---|---|---|---|---|
| 4,142,136 A * | 2/1979 | Witter | ............... | H02P 1/28 318/779 |
| 4,282,423 A * | 8/1981 | Volz | ............... | G05D 23/24 219/442 |
| 4,305,030 A * | 12/1981 | Lorenz | ............... | H02P 3/26 318/371 |
| 4,392,098 A * | 7/1983 | Min | ............... | H02P 3/26 318/371 |
| 4,459,629 A * | 7/1984 | Titus | ............... | H01H 9/541 307/134 |
| 4,560,913 A * | 12/1985 | Min | ............... | H02P 3/24 318/759 |
| 5,650,901 A * | 7/1997 | Yamamoto | ............... | H01H 9/542 361/100 |
| 5,793,586 A * | 8/1998 | Rockot | ............... | H01H 33/596 361/8 |
| 5,815,387 A * | 9/1998 | Aritsuka | ............... | H02J 3/1814 361/100 |
| 6,144,191 A * | 11/2000 | Raedy | ............... | H02J 3/1807 323/207 |
| 6,163,129 A * | 12/2000 | Younger | ............... | H02P 1/26 318/798 |
| 6,586,905 B1 * | 7/2003 | Johnson | ............... | H02P 3/18 318/700 |
| 6,683,393 B2 * | 1/2004 | Lewis | ............... | H02M 5/293 307/115 |
| 6,992,872 B2 * | 1/2006 | Morris | ............... | H02H 11/008 324/509 |
| 7,034,475 B2 * | 4/2006 | Kato | ............... | H02P 3/14 318/139 |
| 7,068,010 B2 * | 6/2006 | Youm | ............... | H02M 7/5387 318/434 |
| 7,075,257 B2 * | 7/2006 | Carrier | ............... | H02P 3/12 318/375 |
| 7,158,393 B2 * | 1/2007 | Schneider | ............... | H02J 3/1842 363/34 |
| 7,193,387 B1 * | 3/2007 | Lu | ............... | H02P 21/0017 318/431 |
| 7,227,326 B1 * | 6/2007 | Lu | ............... | H02P 6/182 318/461 |
| 7,298,105 B1 * | 11/2007 | Lu | ............... | H02P 21/0017 318/432 |
| 7,369,346 B2 * | 5/2008 | Yamamoto | ............... | G11B 21/12 360/75 |
| 7,538,507 B2 * | 5/2009 | Lu | ............... | H02P 6/182 318/461 |
| 8,067,859 B2 * | 11/2011 | Koeppl | ............... | H02H 7/0844 307/127 |
| 8,232,679 B2 * | 7/2012 | Bobb | ............... | H02J 9/062 307/85 |
| 2002/0012210 A1 * | 1/2002 | Morris | ............... | H02H 11/008 361/23 |
| 2003/0122431 A1 * | 7/2003 | Lewis | ............... | H02M 5/293 307/112 |
| 2004/0090807 A1 * | 5/2004 | Youm | ............... | H02M 7/5387 363/132 |
| 2004/0164617 A1 * | 8/2004 | Bobb | ............... | H02J 9/062 307/64 |
| 2004/0227480 A1 * | 11/2004 | Kato | ............... | H02P 3/14 318/376 |
| 2005/0052145 A1 * | 3/2005 | Carrier | ............... | H02P 3/12 318/381 |
| 2005/0068706 A1 * | 3/2005 | Lewis | ............... | H02M 5/293 361/100 |
| 2006/0164749 A1 * | 7/2006 | Yamamoto | ............... | G11B 21/12 360/75 |
| 2006/0202636 A1 * | 9/2006 | Schneider | ............... | H02J 3/1842 315/291 |
| 2007/0216337 A1 * | 9/2007 | Lu | ............... | H02P 21/0017 318/800 |
| 2007/0247099 A1 * | 10/2007 | Lu | ............... | H02P 6/182 318/461 |
| 2008/0225457 A1 * | 9/2008 | Korrek | ............... | G05B 9/02 361/100 |
| 2009/0154047 A1 * | 6/2009 | Ykema | ............... | H01H 9/547 361/100 |
| 2010/0148733 A1 * | 6/2010 | Koeppl | ............... | H02H 7/0844 323/225 |
| 2011/0203345 A1 * | 8/2011 | Adolphy | ............... | B21C 31/00 72/453.02 |
| 2012/0087049 A1 * | 4/2012 | Komatsu | ............... | H02H 7/1216 361/20 |
| 2012/0169125 A1 * | 7/2012 | Bobb | ............... | H02J 9/062 307/64 |
| 2012/0227729 A1 * | 9/2012 | Lundahl | ............... | F24J 2/38 126/601 |
| 2012/0286862 A1 | 11/2012 | Korrek | | |
| 2012/0299578 A1 | 11/2012 | Korrek | | |
| 2013/0015704 A1 * | 1/2013 | Tsai | ............... | H02J 9/062 307/23 |
| 2013/0235492 A1 * | 9/2013 | Zhou | ............... | H02H 7/065 361/18 |
| 2014/0021789 A1 * | 1/2014 | Greer | ............... | H02J 9/06 307/64 |
| 2014/0361624 A1 * | 12/2014 | Ault | ............... | H02J 9/062 307/65 |

FOREIGN PATENT DOCUMENTS

| | | |
|---|---|---|
| DE | 2321635 A1 | 11/1974 |
| DE | 3317964 A1 | 11/1984 |
| DE | 19601540 A1 | 11/1996 |
| DE | 102006038209 A1 | 2/2008 |
| WO | WO-2007014725 A1 | 2/2007 |

OTHER PUBLICATIONS

International Preliminary Report on Patentability for International Application No. PCT/EP2012/066881 mailed Jan. 12, 2015.

Chinese Office Action and English translation thereof dated Feb. 14, 2016.

* cited by examiner

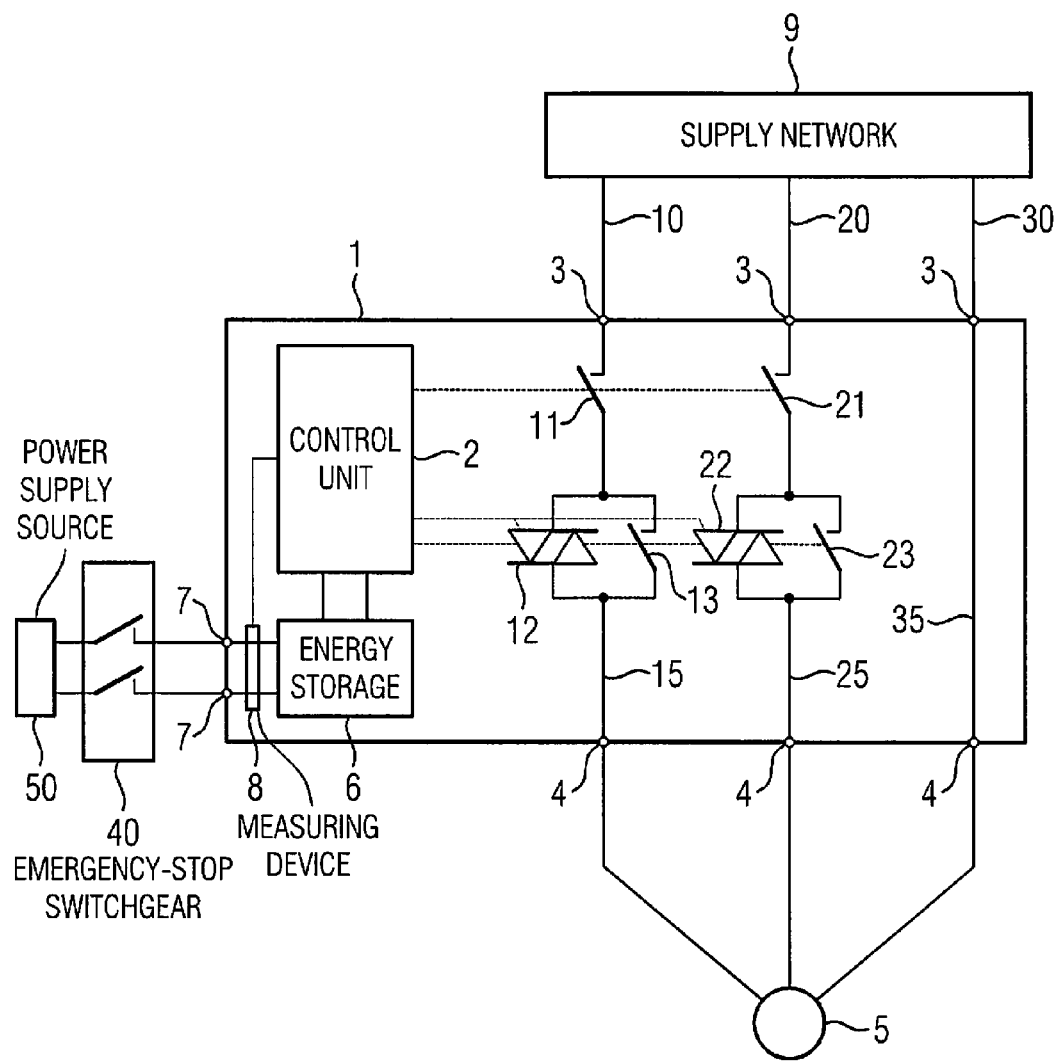

SWITCHGEAR FOR CONTROLLING THE ENERGY SUPPLY OF AN ELECTRIC MOTOR CONNECTED THERETO

PRIORITY STATEMENT

This application is the national phase under 35 U.S.C. §371 of PCT International Application No. PCT/EP2012/066881 which has an International filing date of Aug. 30, 2012, which designated the United States of America, the entire contents of which are hereby incorporated herein by reference.

FIELD

At least one embodiment of the invention generally relates to a switchgear and/or a method for the switchgear. The switchgear according to at least one embodiment of the invention is in particular used in industrial automation. The switchgear according to at least one embodiment is in particular a motor starter.

BACKGROUND

The switchgear can be used to control an electric motor connected downstream from the switchgear. To this end, energy is supplied to the electric motor connected downstream from the switchgear via the switchgear so that the electric motor is connected to a supply network. The supply network is in particular a low-voltage network for an industrial installation (for example three phases, 400 volt, 50 hertz).

To control the energy supply of the downstream electric motor, the switchgear comprises a control unit and a first current path. A first phase of the supply network is supplied to the downstream electric motor via the first current path. The first current path comprises a first electromechanical switch and, connected in series to the first switch, a parallel connection of a second electromechanical switch with a semiconductor switch. The control unit can output a switching signal for the first switch, the second switch and the semiconductor switch and in this way, control the desired switching state of the switches. The first and second switches are in particular make-contacts, which, in the presence of a switching signal of the control unit, are held in the closed switching state. If the switching signal is switched off by the first or second switch, due to a restoring force (for example a spring force acting on a contact of the switch), the switch automatically adopts the open state. Switches of this kind are in particular relays. In the presence of the switching signal of the control unit, the semiconductor switch preferably adopts the electrically conducting state.

The switchgear comprises a supply connection via which the control unit can draw the energy for the switching signals. Usually, a decentralized power supply source is connected via a line to the supply connection of the switchgear so that, in the active operation of the switchgear, a supply voltage is applied through the supply connection. The switchgear draws the energy required for the switching signals via the supply connection. Preferably, the entire internal energy supply of the switchgear is drawn through the supply connection of the switchgear.

The switchgear is preferably used to switch three-phase motors and also single-phase AC motors on and off and to protect the motors against overload. Preferably, the switchgear can also be used in safety applications. In this case, it is necessary to ensure that the motor is reliably switched off.

In the case of switchgears with emergency shutdown of the motor connected to the switchgear, one possible shutdown principle is to switch off the supply voltage of the switchgear by use of a switchgear inserted into the supply line between the power supply source and the supply connection (for example an emergency-stop switchgear). Functionally, the removal of the supply voltage causes the electromechanical switches of the switchgear automatically to adopt the off condition (i.e. the switches are opened). In this way, when the supply voltage is removed, the energy supplied via the switchgear to the motor is switched off so that the motor is reliably switched off. Switching-off the power supply source and the automatic opening of the switches causes a circuit-breaking arc to form at the switches, which causes heavy wear at the switches so that the number of switching operations of this kind is usually limited for the switchgears.

SUMMARY

At least one embodiment of the invention is based on providing a switchgear with an increased number of switching operations, in particular with respect to a switching operation based on the switching-off of the supply voltage at the supply connection. The switchgear should in particular ensure that an electric motor connected to the switchgear is switched off reliably.

A switchgear of at least one embodiment includes a control unit, a supply connection and a first current path comprising a first electromechanical switch and, connected in series to the first switch, a parallel connection of a second electromechanical switch with a semiconductor switch, wherein the control unit can output a switching signal for the first switch, the second switch and the semiconductor switch, wherein, in the presence of a switching signal, the first and second switches are held in the closed switching state, wherein the control unit can draw the energy for the switching signals through the supply connection, wherein the switchgear comprises an energy accumulator and a measuring device, wherein the control unit is capable of monitoring the energy supplied through the supply connection via the measuring device, wherein the control unit is designed such that, if energy supplied through the supply connection reaches a critical range, it controls the output of the switching signals via the energy of the energy accumulator such that, in a first step, the semiconductor switch is switched to be electrically conducting and then the second switch is opened, in a second step after the first step, the semiconductor switch is switched to be electrically non-conducting and then the first switch is opened.

In at least one embodiment, a method is disclosed for a switchgear comprising a control unit, a supply connection and a first current path, wherein the first current path comprises a first electromechanical switch and, connected in series to the first switch, a parallel connection of a second electromechanical switch with a semiconductor switch, wherein the control unit can output a switching signal for the first switch, the second switch and the semiconductor switch, wherein, in the presence of a switching signal, the first and second switches are held in the closed switching state, wherein the control unit draws the energy for the switching signals through the supply connection, wherein the switchgear comprises an energy accumulator and a measuring device, wherein the control unit monitors the energy supplied through the supply connection via the measuring device, wherein if energy supplied through the supply connection reaches a critical range, the control unit controls the output of the switching signals via the energy of the energy accumulator such that:

in a first step the semiconductor switch is switched to be electrically conducting and then the second switch is opened, in a second step following the first step, the semiconductor switch is switched to be electrically non-conducting and then the first switch is opened.

In a further advantageous embodiment of the invention, the switchgear comprises a second current path comprising a first electromechanical switch and, connected in series to the first switch, a parallel connection of a second electromechanical switch with a semiconductor switch, wherein the control unit can output a switching signal for the first switch, the second switch and the semiconductor switch of the second current path, wherein, in the presence of a switching signal, the first and second switches of the second current path are held in the closed switching state, wherein the control unit is designed such that, if energy supplied through the supply connection reaches the critical range, it controls the output of the switching signals via the energy of the energy accumulator such that:

in a first step, the semiconductor switch of the second current path is switched to be electrically conducting and then the second switch of the second current path is opened, in a second step following the first step, the semiconductor switch of the second current path is switched to be electrically non-conducting and then the first switch of the second current path is opened.

Advantageous developments of the invention are disclosed in the dependent claims.

BRIEF DESCRIPTION OF THE DRAWINGS

The invention and embodiments of the invention are described and explained below with reference to the example embodiment illustrated in the FIGURE.

The FIGURE is a schematic diagram illustrating of a system for the reliable operation of an electric motor 5. The system comprises a supply network 9, the electric motor 5, a switchgear 1, a power supply source 50 and an emergency-stop switchgear 40.

DETAILED DESCRIPTION OF THE EXAMPLE EMBODIMENTS

During the active operation of the electric motor connected downstream from the switchgear, the energy for the electric motor is supplied via the first current path.

On the presence of the switching signal, the first and second switches adopt the closed switching state. If the switching signal at the first and/or second switch is switched off; i.e. if no switching signal is applied to the switch, the corresponding switch automatically adopts the open switching state. In the case of a switching signal, in particular a voltage is applied via the control circuit of the switch, in particular approximately 12 volt. If there is no switching signal, in particular no voltage is applied via the control circuit of the switch.

The control unit can in particular monitor the energy supplied through the supply connection for the switching signal of the control unit via the measuring device.

Monitoring the energy supplied through the supply connection via the measuring device enables, in the case of a drop in the supply voltage into a critical range, which is preferably stored in the control unit or measuring device, a regulated disconnection of the energy supplied to the connected electric motor via the first current path.

The critical range is preferably separated via a reference value from the correct range in which a correct energy supply through the supply connection is present. Hence, the reference value is a threshold value or threshold value range. The reference value is in particular also calculated such that, if the reference value is exceeded, sufficient energy is supplied through the supply connection so that a correct switching signal output by the control unit is ensured and, if the reference value is undershot, makes it impossible for the energy supplied through the supply connection to jeopardize a correct switching signal output by the control unit.

The critical range in particular characterizes a voltage range at the supply connection, which is below a maximum of approximately 70%, preferably approximately 50%, of the maximal permissible voltage to be connected to the supply connection.

The measuring device is in particular a device for measuring the supply voltage applied to the supply connection so that the control unit is able to monitor the supply voltage applied through the supply connection via the measuring device. The measurement by the measuring device takes place in particular in the range between the connecting point of the supply connection and the energy accumulator.

The control unit can itself comprise the energy accumulator.

The supply connection is preferably only used for an internal energy supply to the switchgear.

Preferably, during the correct operation of the switchgear, approximately 24 volts is applied to the supply connection.

The semiconductor switch is preferably a triac or two antiparallel-switched thyristors.

If a critical energy supply was detected via the measuring device, the control via the control unit is performed such that, in the first step, the semiconductor switch is switched to be electrically conducting and the second switch is opened after the closure of the semiconductor switch. In the first step, the first switch remains closed. In the second step, first the semiconductor switch is switched to be electrically non-conducting and then the first switch is opened. The control unit draws the energy required to output the necessary switching signals for the first and second step from the energy accumulator.

An advantage achieved with at least one embodiment of the invention resides in the fact that improved switching performance can be achieved in the switchgear with low additional hardware costs. It is in particular possible with respect to an emergency shutdown, to achieve an increased number of switching operations for the switchgear through the supply connection. The wear usually caused to the switches by switching off the supply voltage can be prevented by the controlled shut-down. The energy required for the switching signal to this end is provided by the energy accumulator.

In one advantageous embodiment of the invention, the energy accumulator is charged through the supply connection. The energy accumulator preferably comprises at least one capacitor, which has an electrically conductive connection with the supply connection.

In a further advantageous embodiment of the invention, the energy accumulator is designed such that it ensures the output of the switching signals required for the first and second steps.

In a further advantageous embodiment of the invention, the switchgear comprises a second current path comprising a first electromechanical switch and, connected in series to the first switch, a parallel connection of a second electromechanical switch with a semiconductor switch, wherein the control unit can output a switching signal for the first switch, the second switch and the semiconductor switch of the second current path, wherein, in the presence of a switching signal, the first and second switches of the second current path are held in the closed switching state, wherein the control unit is designed such that, if energy supplied through the supply connection reaches the critical range, it controls the output of the switching signals via the energy of the energy accumulator such that:

in a first step, the semiconductor switch of the second current path is switched to be electrically conducting and then the second switch of the second current path is opened, in a second step following the first step, the semiconductor switch of the second current path is switched to be electrically non-conducting and then the first switch of the second current path is opened.

The control of the second current path via the control unit is preferably performed similarly to that of the first current path. The second current path can be designed similarly to the first current path.

The switchgear can furthermore comprise a third current path. Here, the third current path can be designed similarly to the first or the second current path. The control of the switches of the third current path can also take place in similar way to that of the first current path.

In a further advantageous embodiment of the invention, the control unit is designed such that, in the second step, at current zero of the energy supplied therethrough, it switches the semiconductor switch to the electrically non-conducting state.

In a further advantageous embodiment of the invention, for the reliable operation of an electric motor, a system comprises the described switchgear, a power supply source and a further switchgear, wherein the further switchgear is inserted into the supply line of the power supply source for the supply connection of the switchgear such that an actuation of the further switchgear interrupts energy supplied through the power supply source to the switchgear.

The FIGURE is a schematic diagram illustrating of a system for the reliable operation of an electric motor 5. The system comprises a supply network 9, the electric motor 5, a switchgear 1, a power supply source 50 and an emergency-stop switchgear 40.

The three input-side connection points 3 of the switchgear 1 are connected to the supply network 9 and its three output-side connection points 4 are connected to the electric motor 5. The electric motor 5 is an asynchronous motor. The supply network 9 is a three-phase AC network of an industrial low-voltage switching station. The switchgear 1 is a motor starter 1 by which the energy supply of the downstream electric motor 5 can be controlled.

A first phase 10 of the supply network 9 is connected by a line to the input-side connection point 3 and is supplied internally via a first current path 15 of the motor starter 1 to the output-side connection point 4 and then supplied by way of a further line to the electric motor 5. The first current path 15 of the motor starter 1 connects the input-side connection point 3 of the motor starter 1 internally to the output-side connection point 4 of the motor starter 1. The first current path 15 comprises a first electromechanical switch 11, a semiconductor switch 12, here a triac, and a second electromechanical switch 13. The first switch 11 is connected in series with the parallel connection of the semiconductor switch 12 to the second switch 13. Consequently, the first phase 10 of the supply network 9 is supplied to the electric motor 5 via the first current path 15.

A second phase 20 of the supply network 9 is connected by a line to the input-side connection point 3 and is supplied internally via a second current path 25 of the motor starter 1 to the output-side connection point 4 and then supplied to the electric motor 5 by way of a further line. The second current path 25 of the motor starter 1 connects the input-side connection point 3 of the motor starter 1 internally to the output-side connection point 4 of the motor starter 1. The second current path 25 comprises a first electromechanical switch 21, a semiconductor switch 22, here a triac, and a second electromechanical switch 23. The first switch 21 is connected in series with the parallel connection of the semiconductor switch 22 to the second switch 23. Consequently, the second phase 20 of the supply network 9 is supplied via the second current path 25 to the electric motor 5.

A third phase 30 of the supply network 9 is connected by a line to the input-side connection point 3 and is supplied internally via a third current path 35 of the motor starter 1 to the output-side connection point 4 and then supplied by way of a further line to the electric motor 5. The third current path 35 of the motor starter 1 connects the input-side connection point 3 of the motor starter 1 internally to the output-side connection point 4 of the motor starter 1. The motor starter 1 depicted is a 2-phase controlled motor starter so that the third current path forms a stable internal electrical contact between the input-side and output-side connection point 3, 4. However, it is also conceivable for the third current path 35 also to comprise at least one switch or to be designed similarly to the first and/or the second current path 15, 25 of the motor starter 1.

The motor starter 1 comprises a control unit 2 by which the switch position of the electromechanical switches 11, 13, 21, 23 and the semiconductor switch 12, 22 is controlled. To this end, the control unit 2 can output switching signals to the switches 11, 12, 13, 21, 22, 23. The switching signal applies a voltage to the switch 11, 12, 13, 21, 22, 23. The electromechanical switches 11, 13, 21, 23 are subjected to a spring force so that, to hold the closed position, they have to be controlled with the switching signal since they would otherwise automatically adopt the open switching state. I.e. as soon as the switching signal at the electromechanical switch 11, 13, 21, 23 is removed, it automatically adopts the open switch position. Via the control unit 2, the respective semiconductor switch 12, 22 can be switched to an electrically conducting state and an electrically non-conducting state (blocked state). In the electrically non-conducting state of the semiconductor switch 12, 22, the energy transmission via the semiconductor switch 12, 22 is blocked.

The first electromechanical switches 13, 23 are make-contacts of a first relay. The second electromechanical switches 11, 21 are make-contacts of a second relay. However, it is also conceivable for the individual switches or only the first or second switches 11, 13, 21, 23 to be controlled by way of a separate relay.

The motor starter 1 draws the internal energy supply through its supply connection 7. To this end, the supply connection 7 is connected by two conductors to a power supply source 50, which for example provides approximately 24 volt. Hence, when there is an existing electrically conducting connection to the power supply source 7, a supply voltage of approximately 24 volts is applied to the supply connection 7. The electrical energy drawn through the supply connection 7 enables the control unit 2 to output the necessary switching signals to the respective switches 11, 12, 13, 21, 22, 23.

Inside the motor starter, the supply connection 7 is connected to the control unit 2 so that the control unit 2 can draw the electrical energy for the switching signals from this. The motor starter 1 furthermore comprises an energy store 6, which is also connected internally to the supply connection 7 and can provide the control unit 2 with energy for the switching signals. The energy accumulator 6 is a capacitor, which is charged through the supply connection 7.

Arranged between the supply connection 7 and the energy accumulator 6 is a measuring device 8 of the motor starter 1, by which the supply voltage applied to the supply connection 7 can be determined. Hence, the control unit 2 can monitor the energy supplied through the supply connection 7 of the control unit by way of the measuring device 8.

Here, the supply voltage determined by the measuring device 8 is compared with a reference value stored in the measuring device 8. If the supply voltage determined is higher than the reference value, there is a sufficient energy supply through the supply connection 7 so that a correct switching signal output by the control unit 2 is ensured. However, if the value is below the reference value, the energy supply through the supply connection 7 is an energy supply that jeopardizes the correct output of switching signals by the control unit 2. Hence, the energy supplied through the supply connection 7 is in the critical range.

The threshold value formed by the reference value with respect to the monitored supply voltage is 50% of the maximum permissible voltage to be connected to the supply connection 7. If the monitoring of the supply voltage via the measuring device 8 reveals that a supply voltage of less than 50% of the maximum permissible voltage to be connected to the supply connection is applied to the supply connection 7, the energy supply is in the critical range. If a state of this kind pertains, the measuring device 8 issues a warning signal to the control unit 2.

The emergency-stop switchgear 40 is arranged between the power supply source 50 and the motor starter 1 such that it is able to interrupt the energy supply of the motor starter taking place via the two conductors. To this end, the emergency-stop switchgear 40 comprises in each case two switching elements, which are each able to interrupt a line.

If a correct supply voltage is applied to the supply connection 7, the motor starter 1 is able to establish an energy supply for the connected electric motor 5. Consequently, the supply voltage determined by the measuring device 8 is not within the critical range.

If a running electric motor 5 is operating within the nominal range, in the motor starter 1 the first switches 11, 21 are closed, the semiconductor switches 12, 22 are switched to be electrically non-conducting and the second switches 13, 23 are closed.

A possible shut-down principle for the electric motor 5 connected downstream from the motor starter 1 is to switch off the supply voltage of the motor starter 1 by the emergency-stop switchgear 40 inserted into the supply line between the power supply source 50 and the supply connection 7. To this end, the emergency-stop switchgear 40 is actuated so that it opens at least one of its switching elements.

If the emergency-stop switchgear 40 is actuated in this way, no voltage is applied through the supply connection 7. Hence, the supply voltage at the supply connection 7 reaches the critical range. Since the control unit 2 monitors the energy supplied through the supply connection 7 via the measuring device 8, a state change of this kind is recognized with respect to the energy supplied through the supply connection 7.

The control unit 2 then automatically performs a regulated shut-down of the connected electric motor 5. Here, the energy for the output of the necessary switching signals is drawn from the energy accumulator 6.

In a first step, the control unit 2 switches the semiconductor switches 12, 22 to the electrically conducting state. The first switches 11, 21 are also controlled by a switching signal of the control unit 2 so that they remain in the closed position. Functionally, the removal of the switching signals at the first relay causes the second switch 13, 23 automatically to enter the open state. Hence, the energy supply of the electric motor 5 continues via the motor starter 1. The control unit 2 draws the energy for the switching signals to be output (semiconductor switches 12, 22 and first switches 11, 21) during the first step from the energy accumulator 6.

In a second step following the first step, the control unit 2 switches the semiconductor switches 12, 22 at current zero to the electrically non-conducting state. Hence, there is an arc-free interruption of the energy supply via the first and second current paths 15, 25. This switching operation takes place immediately after it has been ensured that that the second switches 13, 23 are opened. As soon as the energy supply via the semiconductors 12, 22 has been interrupted, the energy supply to the electric motor 5 is interrupted. When it has been ensured that the energy supply via the semiconductors 12, 22 has been interrupted, the switching signal is cleared from the second relay and hence from the first switches 11, 21. Functionally, the clearance of the switching signal at the second relay causes the first switch 11, 21 automatically to enter the opened state. Hence, the first switches 11, 21 are opened at zero current. The control unit 2 draws the energy for the switching signals to be output during the second step from the energy accumulator 6.

By sufficiently dimensioned buffering of supply voltage in the energy accumulator 6 and internal monitoring of the supply voltage applied at the supply connection 7, on the switching-off of the supply voltage, a defined interruption of the energy supply to the electric motor 5 can take place without any arcing at the switches 11, 13, 21, 23.

If the outage or switching-off causes the supply voltage determined by the detection device 8 to fall below a predefined threshold (reference value), a warning signal is sent to the control unit 2. This immediately initiates the defined switching-off of the electric motor 5. The defined switching-off preferably corresponds to the shut-down process performed by the switchgear 1 during a normal shut-down process (operational shut-down of the electric motor 5 via control input) via the control unit 2.

The buffering of the energy accumulator 6 is designed such that sufficient energy is available to control the switches 11, 12, 13, 21, 22, 23 until the end of the shut-down process. In this way, it is also possible to perform a regular shut-down process during an emergency shutdown without over-stressing the mechanical switches 11, 13, 21, 23. Hence, a wear-free shut-down takes place in the event of an emergency, which is implemented by shutting down the supply voltage. The defined shut-down via wear-free semiconductors and buffering of the supply voltage for the duration of this shut-down process can achieve a greatly increased lifetime of the mechanical switches 11, 13, 21, 23 and hence of the entire switchgear 1.

The invention claimed is:

1. A switchgear, comprising:
   a control unit;
   a supply connection; and
   a first current path including a first electromechanical switch and, connected in series to the first switch, a parallel connection of a second electromechanical switch with a semiconductor switch, wherein the control unit is configured to output a switching signal for the first switch, the second switch and the semiconductor switch, wherein, in the presence of a switching signal, the first and second switches are held in the closed switching state, and wherein the control unit is configured to draw the energy for the switching signals through the supply connection;
   an energy accumulator, including at least one capacitor; and
   a measuring device,
   wherein the control unit configured to monitor the energy supplied through the supply connection via the measuring device, and wherein, if energy supplied through the supply connection reaches a critical range, the control unit is configured to controls the output of the switching signals via the energy of the energy accumulator such that:
   in a first step, the semiconductor switch is switched to be electrically conducting and then the second switch is opened, and
   in a second step following the first step, the semiconductor switch is then switched to be electrically non-conducting, and thereafter the first switch is opened.

2. The switchgear of claim 1, wherein the energy accumulator is chargeable through the supply connection.

3. The switchgear of claim 2, wherein the energy accumulator is designed to ensure the output of the switching signals required for the first and second steps.

4. A system for the reliable operation of an electric motor, comprising:
   the switchgear of claim 2;
   a power supply source; and
   a further switchgear, wherein the further switchgear is inserted into the supply line of the power supply source for the supply connection of the switchgear such that an actuation of the further switchgear interrupts an energy supplied through the power supply source to the switchgear.

5. The switchgear of claim 1, wherein the energy accumulator is designed to ensure the output of the switching signals required for the first and second steps.

6. The switchgear of claim 1, wherein the switchgear comprises a second current path including a first electromechanical switch and, connected in series to the first switch, a parallel connection of a second electromechanical switch with a semiconductor switch, wherein the control unit is configured to output a switching signal for the first switch, the second switch and the semiconductor switch of the second current path, wherein, in the presence of a switching signal, the first and second switches of the second current path are held in the closed switching state, and wherein the control unit is designed such that, if energy supplied through the supply connection reaches the critical range, the control unit is configured to control the output of the switching signals via the energy of the energy accumulator such that:
   in a first step, the semiconductor switch of the second current path is switched to be electrically conducting and then the second switch of the second current path is opened,
   in a second step following the first step, the semiconductor switch of the second current path is switched to be electrically non-conducting and then the first switch of the second current path is opened.

7. A system for the reliable operation of an electric motor, comprising:
   the switchgear of claim 6;
   a power supply source; and
   a further switchgear, wherein the further switchgear is inserted into the supply line of the power supply source for the supply connection of the switchgear such that an actuation of the further switchgear interrupts an energy supplied through the power supply source to the switchgear.

8. The switchgear of claim 1, wherein the control unit is designed such that, in the second step, at current zero of the energy supplied therethrough, the control unit is configured to switch the semiconductor switch to the electrically non-conducting state.

9. The switchgear of claim 1, wherein the supply connection is only used for an internal energy supply to the switchgear.

10. A system for the reliable operation of an electric motor, comprising:
    the switchgear 1;
    a power supply source; and
    a further switchgear, wherein the further switchgear is inserted into the supply line of the power supply source for the supply connection of the switchgear such that an actuation of the further switchgear interrupts an energy supplied through the power supply source to the switchgear.

11. A method for a switchgear including a control unit, a supply connection and a first current path, wherein the first current path includes a first electromechanical switch and, connected in series to the first switch, a parallel connection of a second electromechanical switch with a semiconductor switch, wherein the control unit is configured to output a switching signal for the first switch, the second switch and the semiconductor switch, wherein, in the presence of a switching signal, the first and second switches are held in the closed switching state, wherein the control unit is configured to draw energy for the switching signals through the supply connection the switchgear including an energy accumulator, which includes at least one capacitor, and a measuring device, the method comprising:
    monitoring, via the control unit, the energy supplied through the supply connection; and
    controlling via the control unit, if the energy supplied through the supply connection reaches a critical range, the output of the switching signals via the energy of the energy accumulator such that:
    in a first step, the semiconductor switch is switched to be electrically conducting and then the second switch is opened, and
    in a second step following the first step, the semiconductor switch is switched to be electrically non-conducting and then the first switch is opened.

12. The method for the switchgear of claim 11, wherein, in the second step, at current zero of the energy supplied therethrough, the control unit switches the semiconductor switch to the electrically non-conducting state.

* * * * *